(12) United States Patent
Seelig et al.

(10) Patent No.: US 7,774,779 B2
(45) Date of Patent: Aug. 10, 2010

(54) GENERATING A TIMEOUT IN A COMPUTER SOFTWARE APPLICATION

(75) Inventors: Michael J. Seelig, Berkeley, CA (US); Bilal Muzaffar, Dublin, CA (US); Joseph F. Schmidt, Belleville, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1268 days.

(21) Appl. No.: 11/283,544

(22) Filed: Nov. 18, 2005

(65) Prior Publication Data

US 2007/0118843 A1 May 24, 2007

(51) Int. Cl.
G06F 9/46 (2006.01)
(52) U.S. Cl. .................................... 718/100; 718/108
(58) Field of Classification Search .................. 718/108
See application file for complete search history.

(56) References Cited

U.S. PATENT DOCUMENTS

| 4,430,702 | A | * | 2/1984 | Schiebe et al. ............... 710/305 |
| 4,980,671 | A | * | 12/1990 | McCurdy ................. 340/568.1 |
| 5,819,019 | A | * | 10/1998 | Nelson ............................ 714/4 |
| 5,862,326 | A | * | 1/1999 | Bapat ......................... 709/203 |
| H001837 | H | * | 2/2000 | Fletcher et al. .............. 455/433 |
| 6,269,373 | B1 | * | 7/2001 | Apte et al. .......................... 1/1 |
| 6,279,026 | B1 |  | 8/2001 | Clarke et al. |
| 6,446,225 | B1 |  | 9/2002 | Robsman et al. |
| 6,687,859 | B2 |  | 2/2004 | Robsman et al. |
| 6,807,547 | B2 | * | 10/2004 | Matena et al. .......... 707/103 R |
| 7,447,738 | B1 | * | 11/2008 | Andrews et al. ............. 709/204 |
| 2001/0018700 | A1 | * | 8/2001 | Clarke et al. ................. 709/102 |
| 2002/0040409 | A1 | * | 4/2002 | Matena et al. .............. 709/315 |
| 2002/0122062 | A1 |  | 9/2002 | Melamed et al. |
| 2002/0124042 | A1 |  | 9/2002 | Melamed et al. |
| 2002/0165724 | A1 |  | 11/2002 | Blankesteijn |
| 2003/0037294 | A1 |  | 2/2003 | Robsman et al. |
| 2003/0135850 | A1 |  | 7/2003 | Miloushev et al. |
| 2003/0187743 | A1 |  | 10/2003 | Kumaran et al. |
| 2003/0195996 | A1 |  | 10/2003 | Jacobs et al. |
| 2003/0200255 | A1 |  | 10/2003 | Vallone |
| 2003/0233465 | A1 |  | 12/2003 | Le et al. |
| 2004/0210500 | A1 |  | 10/2004 | Sobel et al. |
| 2005/0010902 | A1 |  | 1/2005 | Takacsi-Nagy et al. |
| 2005/0021689 | A1 |  | 1/2005 | Marvin et al. |
| 2005/0022164 | A1 |  | 1/2005 | Takacsi-Nagy et al. |
| 2005/0071841 | A1 | * | 3/2005 | Hoflehner et al. ........... 718/100 |
| 2005/0108710 | A1 |  | 5/2005 | Patiejunas |

(Continued)

*Primary Examiner*—Meng-Ai An
*Assistant Examiner*—Blake Kumabe
(74) *Attorney, Agent, or Firm*—Toler Law Group (57) ABSTRACT

A timeout helper main thread is created for an outbound call associated with a container. The main thread creates a timeout helper worker thread. A local timer is started to detect a first timeout condition based on a first timeout interval. The worker thread initiates a client Object Request Broker (ORB) to detect a second timeout condition based on a second timeout interval. If the outbound call completes within the first timeout interval, a result object is returned from the main thread. Otherwise, the main thread throws a timeout exception. If the outbound call has not completed within the second timeout interval, the client ORB throws an exception to the worker thread and one or more resources associated with the outbound call are reclaimed. As an alternative to the client ORB, an HTTP client can detect the second timeout condition.

20 Claims, 4 Drawing Sheets

U.S. PATENT DOCUMENTS

2005/0125802 A1* 6/2005 Wang et al. .................. 718/108
2005/0149809 A1* 7/2005 Draeger et al. .............. 714/746
2005/0268136 A1* 12/2005 Kostadinov et al. ......... 713/400

* cited by examiner

GENERATING A TIMEOUT IN A COMPUTER SOFTWARE APPLICATION

FIELD OF THE DISCLOSURE

The present disclosure is generally related to generating a timeout in a computer software application.

BACKGROUND

The JAVA® programming language, prior to JAVA® Development Kit (JDK) 1.4, does not provide a way to interrupt blocking calls. This creates a problem within a Web or ENTERPRISE JAVABEANS® (EJB) component model container when a thread handling a request makes an external call to a Hypertext Transfer Protocol (HTTP) or EJB service that does not return. The thread blocks on the call and waits until a Transmission Control Protocol (TCP) timeout closes the connection.

A shortcoming of the TCP timeout is that it cannot be controlled by the application. Further, since the TCP timeout is usually set to a very high value, a supplier application may not be able to meet external or internal customer service level agreements for timely application processing and responses using the TCP timeout. Reliance on the TCP timeout can cause suppliers to lose sales and customers while risking software and hardware crashes due to a large quantity of open customer connections.

DETAILED DESCRIPTION OF THE DRAWINGS

Disclosed herein are embodiments of a timeout helper. The timeout helper can be developed as a general purpose utility that adds timeout functionality to any method call within the Java environment. The timeout helper can be used in a variety of applications including, but not limited to, Web services transactional-based systems. For Web services transactional-based systems, the timeout helper can be used to efficiently track and manage Service Level Agreement (SLA) commitments with external vendors.

Figure 1:
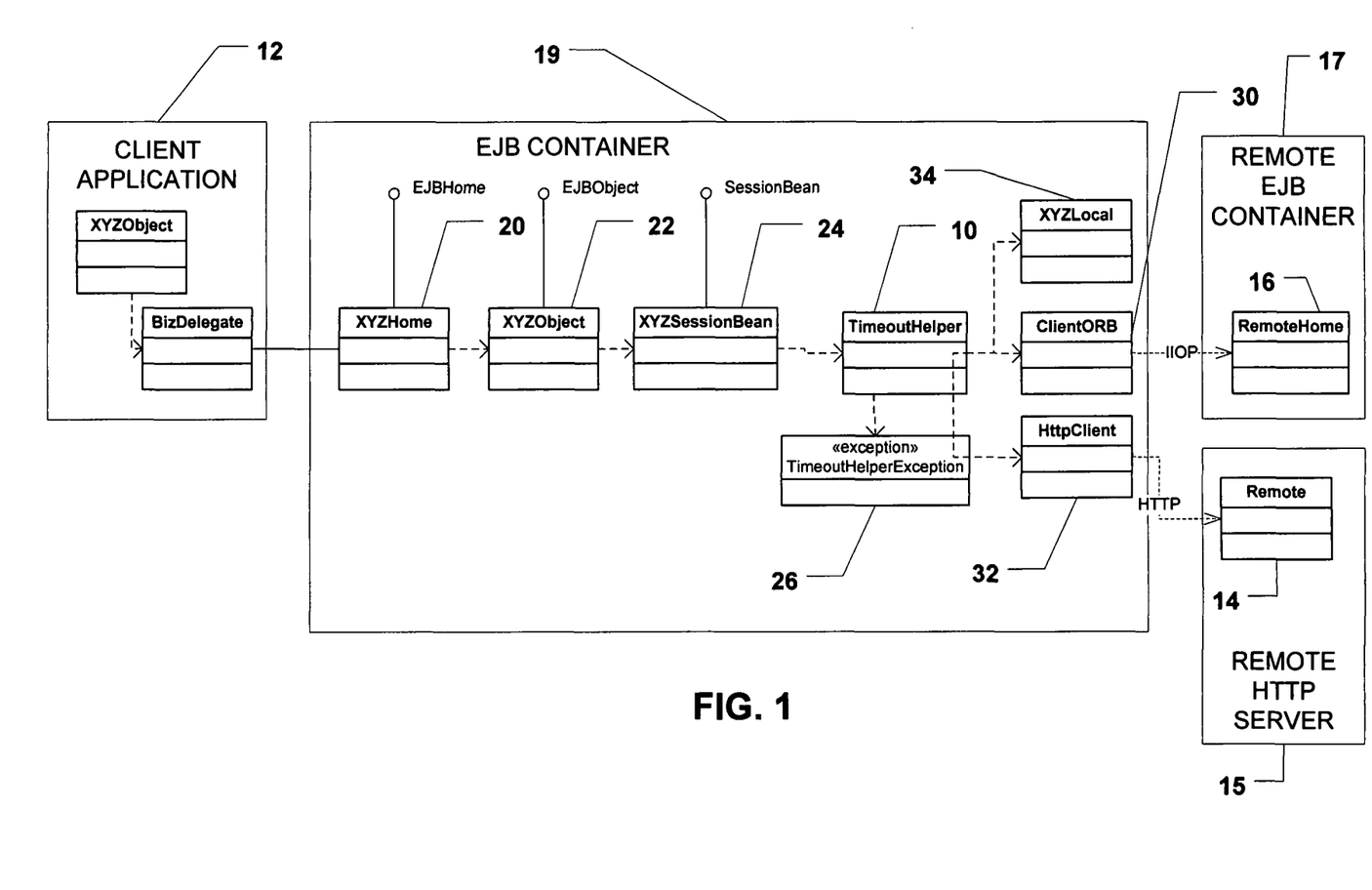
FIG. 1 is a block diagram of a static view of an embodiment of a system that includes a timeout helper.

FIG. 1 is a block diagram of a static view of an embodiment of a system that includes a timeout helper 10. The timeout helper 10 provides an application layer solution to manage timeouts within a Web or ENTERPRISE JAVABEANS® (EJB) component model container of a JAVA® 2 Platform, Enterprise Edition (J2EE™) platform application when container-level support for timeouts is not available in a programming language of a client application 12. The client application 12 can use the timeout helper 10 to make outbound calls to Hypertext Transfer Protocol (HTTP) services (e.g., a remote HTTP service 14 from a remote HTTP server 15) or EJB services (e.g., a remote service 16 from a remote EJB container 17) and to enable such calls to return when a client-application-defined timer in the call expires.

In a particular embodiment, the timeout helper 10 uses reflection to make each call, on behalf of the client application 12, with a respective timeout interval that is desired by the client application 12. The desired timeout interval is passed from the client application 12 to the timeout helper 10. The client application 12 can keep the timeout interval the same from call-to-call, or can change the timeout interval from call-to-call.

In an embodiment, the client application 12 cooperates with a server application that uses a container such as an EJB container 19. As shown in FIG. 1, the EJB container 19 may comprise a home bean 20, a bean object 22 such as an EJB object, and a session bean 24. This session bean façade is an example of how a container-based service may be invoked by the client application 12. The session bean 24 invokes a respective instance of the timeout helper 10 for each of a plurality of outbound calls. The timeout helper 10 is deployed to help control timeouts to remote operations. The timeout helper 10 is created and invoked by a main thread that the EJB container 19 assigns from a container thread pool to service an incoming request. The timeout helper 10, in turn, creates one additional helper thread that manages a timeout condition for each outbound call based on its respective timeout interval. The timeout helper 10 starts a local timer when it creates a helper thread. When the timer expires, the timeout helper main thread creates a timeout exception and returns it to the calling client. Only one helper thread is created per timeout helper instance.

In general, if an outbound method call completes within its timeout interval, the timeout helper 10 returns a result object to the client application 12. Otherwise, if the outbound method call has not completed within its timeout interval, the timeout helper 10 throws a timeout exception 26. The timeout helper 10 handles EJB calls, HTTP calls and local calls in different ways as described below.

For each remote EJB call, the timeout helper 10 creates a new client Object Request Broker (ORB) 30 and sets a timeout interval for an underlying Internet Inter-ORB protocol (IIOP™) protocol. The IIOP™ protocol facilitates communication between the client ORB 30 and remote services such as the remote service 16. Timeouts from the client ORB 30 are caught in a timeout helper worker thread and used to clean-up resources. Optionally, a JAVA VIRTUAL MACHINE™ (JVM™) computer system-level timeout can be set for a default ORB for better performance.

For each HTTP call, the timeout helper 10 uses a HTTP client 32 to set a TCP timeout for HTTP connections. Timeouts from the HTTP client 32 are caught in the timeout helper worker thread and used to clean-up resources. The HTTP client 32 can be any HTTP client that uses a JAVA® programming language socket connection timeout. The HTTP client 32 can comprise custom software, or open source software such as JAKARTA COMMONS HTTP CLIENT™, or a commercial product such as OAKLAND HTTP CLIENT™ formerly known as a NOGOOP HTTP CLIENT™ client.

Controlling of TCP and IIOP™ protocol timeouts by the timeout helper 10 ensures that all blocking HTTP and EJB calls return. Threads associated with these blocking calls can be cleared and their hardware and software resources can be reclaimed. Once freed, the hardware and/or software resources can be used to process additional customer transactions, for example.

For each local call, the timeout helper 10 calls a local service such as a local service 34 on behalf of the client application 12.

Optionally, each call causes a new instance of the timeout helper 10. Thus, a first timeout helper can be used to make a first outbound call within the server EJB container 19 and to manage a first timeout condition for the first outbound call based on a first timeout interval. The first timeout helper either returns a first result object to the client application 12 if the first outbound call completes within the first time interval, or throws a first timeout exception if the first outbound call has not completed within the first timeout interval. Thereafter, a second timeout helper can be used to make a second outbound call within the server EJB container 19 and to manage a second timeout condition for the second outbound call based on a second timeout interval. The second timeout helper either returns a second result object to the client application 12 if the second outbound call completes within the second time interval, or throws a second timeout exception if the second outbound call has not completed within the second timeout interval. The first timeout interval and the second timeout interval may be equal or may differ. Additional timeout helper instances can be created for additional outbound calls. Alternatively, the same instance of a timeout helper can be reused as well with a different timeout value. Multiple instances are used when calling simultaneously.

Multiple thread usage is not recommended for use with the timeout helper 10. It is the responsibility of the programmer to make sure that only one thread at a time can exist within an invoke method per timeout helper instance.

Figure 2:
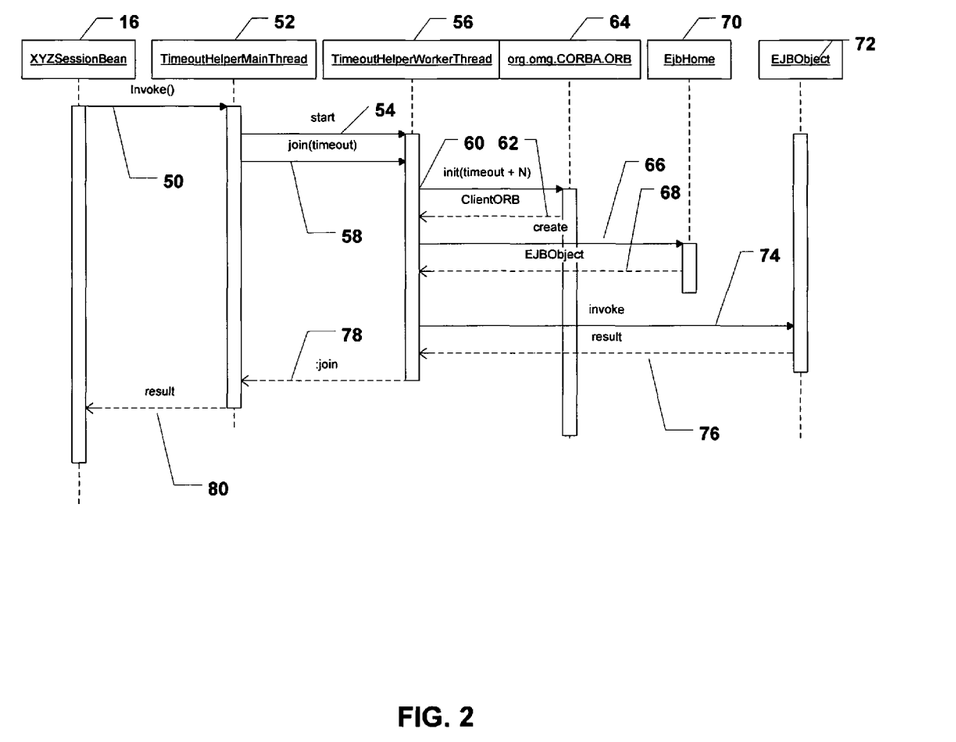
FIG. 2 is a ladder diagram of a sequence of events in an embodiment of the system of FIG. 1 for a remote EJB call that is completed within its timeout interval.
Figure 3:
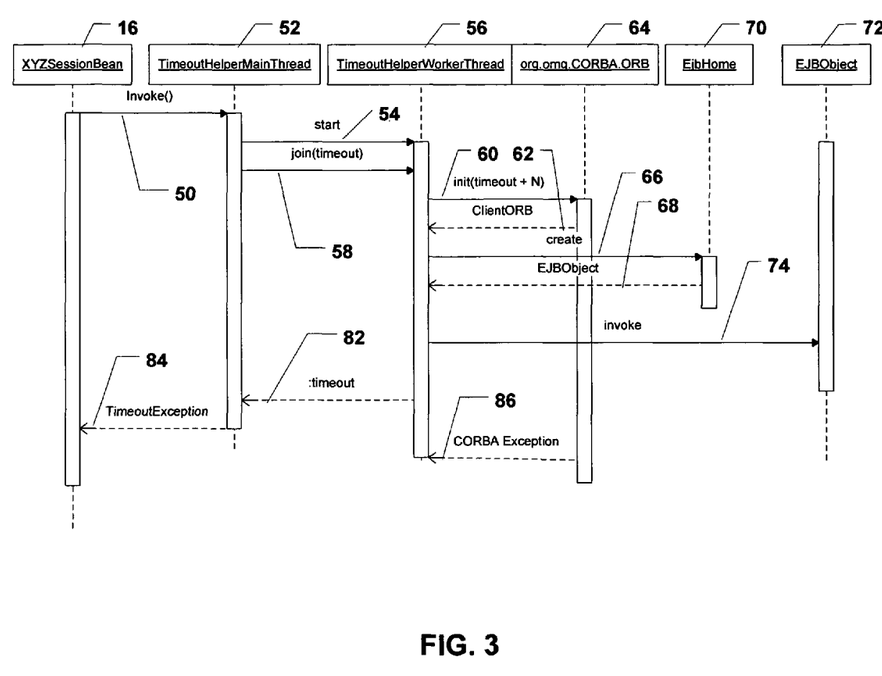
FIG. 3 is a ladder diagram of a sequence of events in an embodiment of the system of FIG. 1 for a remote EJB call that is not completed within its timeout interval.

FIGS. 2 and 3 are flow diagrams of sequences of events in an embodiment of the system of FIG. 1 for a remote EJB call. The following acts are common to both FIGS. 2 and 3. As indicated by act 50, the session bean 16 invokes a timeout helper main thread 52. As indicated by act 54, the timeout helper main thread 52 starts a timeout helper worker thread 56. As indicated by act 58, the timeout helper main thread 52 passes a timeout value to the timeout helper worker thread 56. The timeout helper main thread 52 starts an internal thread join timer and waits for the timeout helper worker thread 56 to complete within a timeout period based on the timeout value. As indicated by acts 60 and 62, the timeout helper worker thread 56 initiates the client ORB 30 to detect for another timeout condition based on the timeout value. The client ORB 30 is created in accordance with a Common Object Request Broker Architecture (CORBA®) architecture and Object Management Group™ (OMG™) group 64. The timeout helper worker thread 56 adds a value N>0 to the timeout value received from the timeout helper main thread 52 so that a timeout on the client ORB 30 is after the timeout on the timeout helper. A timeout on the client ORB 30 causes communications on the ORB to be stopped and its resources to be cleaned up. If the timeout on the client ORB 30 was either before or at the same time as the timeout on the timeout helper, valid responses may be lost because the ORB stopped communication before the client-requested timeout period. Thus, adding the value N>0 ensures that a timeout that the client wanted has expired before the communication is stopped.

As indicated by acts 66 and 68, the timeout helper worker thread 56 cooperates with an EJB home 70 to create an EJB object 72. As indicated by act 74, the timeout helper worker thread 56 invokes the EJB object 72.

FIG. 2 shows acts that occur subsequent to the act 74 when the remote EJB call completes within its timeout interval. In this case, as indicated by act 76, the timeout helper worker thread 56 receives the result of the call from the EJB object 72. As indicated by act 78, the result is passed from the timeout helper worker thread 56 to the timeout helper main thread 52. As indicated by act 80, the result is returned from the timeout helper main thread 52 to the session bean 16 which, in turn, returns the result to the client application 12.

FIG. 3 shows acts that occur subsequent to the act 74 when the remote EJB call does not complete within its timeout interval. In this case, as indicated by act 82, the timeout helper main thread 52 through a self timer of thread join detects a timeout condition for the timeout interval. As indicated by act 84, the timeout helper main thread 52 throws the timeout exception 26 to the session bean 16 and eventually the calling client. As indicated by act 86, after the time value of N after the timeout interval, the client ORB 30 throws a CORBA® architecture exception that is received by the timeout helper worker thread 56 waiting for a response from the client ORB 30. Execution is finished and thread resources are reclaimed by the JAVA VIRTUAL MACHINE™ (JVM™) computer system.

A single instance of the timeout helper can be used to sequentially process multiple requests each with its own timeout. Alternatively, multiple instances of the timeout helper can be used to process simultaneous requests each with its timeout.

Figure 4:
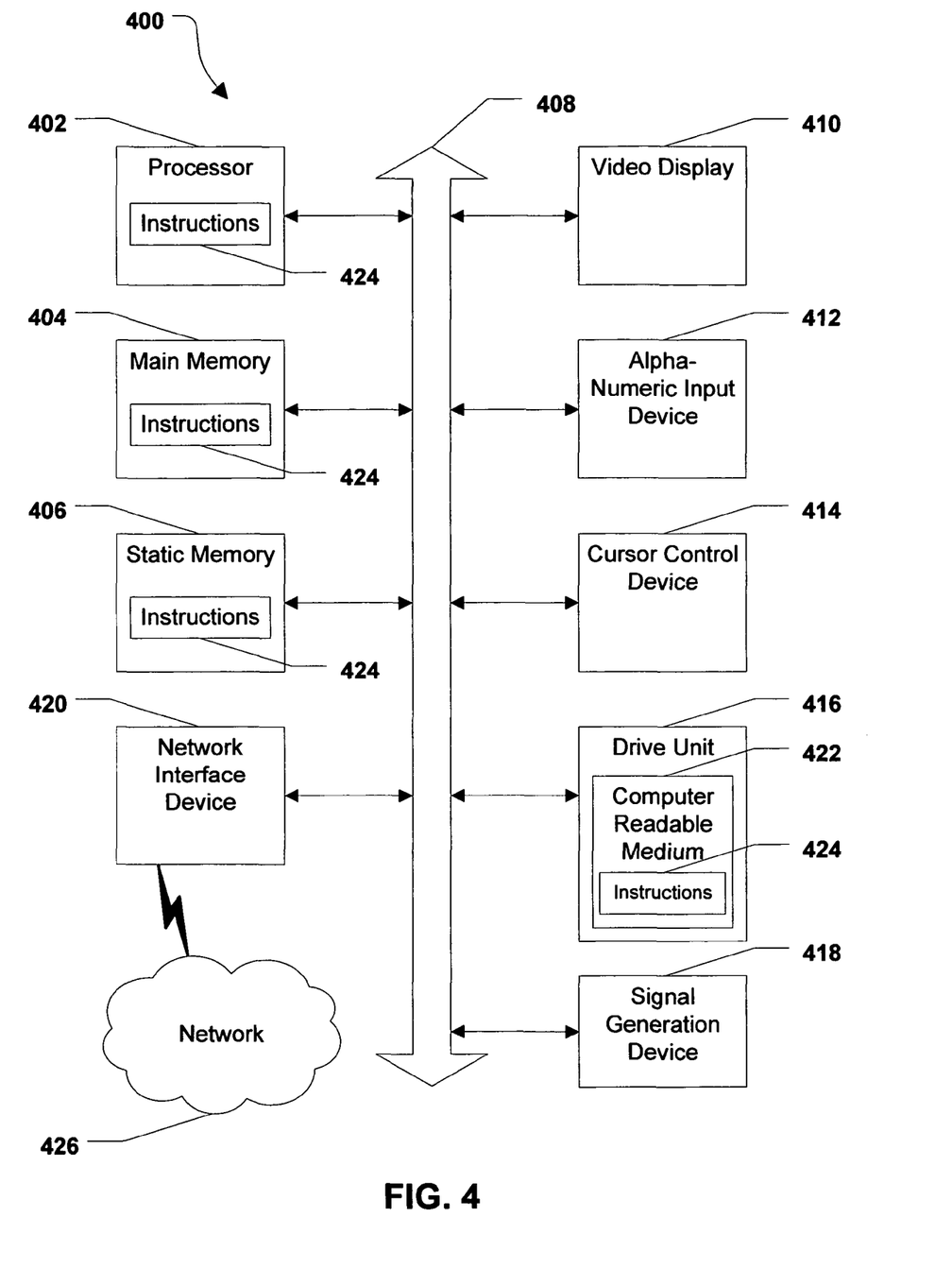
FIG. 4 is a block diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   invoking a timeout helper main thread from a session bean for an outbound call associated with a container;
   creating a timeout helper worker thread by the timeout helper main thread;

starting a local timer with the timeout helper worker thread to detect a first timeout condition based on a first timeout interval;

initiating, by the timeout helper worker thread, a client object request broker (ORB) to detect a second timeout condition based on a second timeout interval, wherein a fixed value N>0 is added to the first timeout interval to determine the second timeout interval;

returning a result object from the timeout helper worker thread to the timeout helper main thread when the timeout helper worker thread receives the result object for the outbound call;

throwing a timeout exception from the timeout helper main thread to the session bean when the outbound call has not completed within the first timeout interval;

throwing a second exception by the client ORB to the timeout helper worker thread when the outbound call has not completed within the second timeout interval, wherein the second exception is used to stop communication on the client ORB; and reclaiming one or more resources associated with the outbound call in response to the second exception with a virtual machine of a computer system.

2. The method of claim 1, further comprising:
passing the first timeout interval from the timeout helper main thread to the timeout helper worker thread.

3. The method of claim 1, further comprising:
returning the result object from the timeout helper main thread to the session bean when the timeout helper main thread receives the result object.

4. The method of claim 1, wherein the one or more resources comprises the timeout helper worker thread.

5. The method of claim 1, wherein the first timeout interval is received from a client application.

6. The method of claim 1, wherein the one or more resources comprises the client ORB.

7. The method of claim 1, wherein the second exception is a common object request broker architecture exception.

8. A method comprising:
invoking a timeout helper main thread from a session bean for an outbound call associated with a container;
creating a timeout helper worker thread by the timeout helper main thread;
starting a local timer to detect a first timeout condition based on a first timeout interval;
returning a result object from the timeout helper worker thread to the timeout helper main thread when the timeout helper worker thread receives the result object from a hypertext transfer protocol (HTTP) client;
throwing a timeout exception from the timeout helper main thread to the session bean when the outbound call has not completed within the first timeout interval;
using the HTTP client to detect a second timeout condition based on a second timeout interval, wherein a fixed value N>0 is added to the first timeout interval to determine the second timeout interval;
receiving, by the timeout helper worker thread, a timeout from the HTTP client when the outbound call has not completed within the second timeout interval;
stopping communication with the HTTP client when the timeout from the HTTP client is received; and
reclaiming one or more resources associated with the outbound call in response to the timeout from the HTTP client with a virtual machine of a computer system.

9. The method of claim 8, further comprising:
passing the first timeout interval from the timeout helper main thread to the timeout helper worker thread.

10. The method of claim 8, further comprising:
returning the result object from the timeout helper main thread to the session bean when the timeout helper main thread receives the result object.

11. The method of claim 8, wherein the one or more resources comprises the HTTP client.

12. The method of claim 8, wherein the first timeout interval is received from a client application.

13. The method of claim 8, wherein the one or more resources comprises the timeout helper main thread.

14. A computer-readable medium having computer-readable program code to cause a computer system to:
invoke a timeout helper main thread from a session bean for an outbound call associated with a container;
create a timeout helper worker thread by the timeout helper main thread;
start a local timer with the timeout helper worker thread to detect a first timeout condition based on a first timeout interval;
initiate, by the timeout helper worker thread, a client object request broker (ORB) to detect a second timeout condition based on a second timeout interval, wherein a fixed value N>0 is added to the first timeout interval to determine the second timeout interval;
return a result object from the timeout helper worker thread to the timeout helper main thread when the timeout helper worker thread receives the result object for the outbound call;
throw a timeout exception from the timeout helper main thread to the session bean when the outbound call has not completed within the first timeout interval;
throw a second exception by the client ORB to the timeout helper worker thread when the outbound call has not completed within the second timeout interval, wherein the second exception is used to stop communication on the client ORB; and
reclaim one or more resources associated with the outbound call in response to the second exception with a virtual machine of a computer system.

15. The computer-readable medium of claim 14, wherein the first timeout interval is received from a client application.

16. The computer-readable medium of claim 14, wherein the one or more resources comprises the timeout helper main thread.

17. The computer-readable medium of claim 14, wherein the second exception is a common object request broker architecture exception.

18. A computer-readable medium having computer-readable program code to cause a computer system to:
invoke a timeout helper main thread from a session bean for an outbound call associated with a container;
create a timeout helper worker thread by the timeout helper main thread;
start a local timer to detect a first timeout condition based on a first timeout interval;
return a result object from the timeout helper worker thread to the timeout helper main thread when the timeout helper worker thread receives the result object from a hypertext transfer protocol (HTTP) client;
throw a timeout exception from the timeout helper main thread to the session bean when the outbound call has not completed within the first timeout interval;
use the HTTP client to detect a second timeout condition based on a second timeout interval, wherein a fixed value N>0 is added to the first timeout interval to determine the second timeout interval;

receive, by the timeout helper worker thread, a timeout from the HTTP client when the outbound call has not completed within the second timeout interval;

stop communication with the HTTP client when the timeout from the HTTP client is received; and reclaim one or more resources associated with the outbound call in response to the timeout from the HTTP client with a virtual machine of a computer system.

19. The computer-readable medium of claim 18, wherein the first timeout interval is received from a client application.

20. The computer-readable medium of claim 18, wherein the one or more resources comprises the timeout helper worker thread.

* * * * *